United States Patent [19]

Funk et al.

[11] Patent Number: 4,648,069
[45] Date of Patent: Mar. 3, 1987

[54] CHARACTER GENERATOR

[75] Inventors: Mark R. Funk, Rochester, Minn.; Paul R. Herrold, Tokyo; Toru Nohzawa, Chigasaki, both of Japan

[73] Assignee: International Business Machines Corporation, Armonk, N.Y.

[21] Appl. No.: 582,654

[22] Filed: Feb. 23, 1984

[30] Foreign Application Priority Data

Mar. 7, 1983 [JP] Japan .................................. 58-36086

[51] Int. Cl.⁴ ............................................... G06F 3/14
[52] U.S. Cl. .................................................... 364/900
[58] Field of Search ... 364/200 MS File, 900 MS File; 340/732, 799

[56] References Cited

U.S. PATENT DOCUMENTS

| | | | |
|---|---|---|---|
| 3,936,664 | 2/1976 | Sato | 340/732 X |
| 4,031,519 | 6/1977 | Findley | 364/900 |
| 4,131,883 | 12/1978 | Lundstrom | 340/799 |
| 4,181,973 | 1/1980 | Tseng | 340/799 X |

Primary Examiner—Thomas M. Heckler
Attorney, Agent, or Firm—Bernard M. Goldman

[57] ABSTRACT

A character generator uses a first memory having a permanent resident area and an overlay area. A second memory stores patterns of all characters. The permanent resident area stores character patterns having the highest frequency of use. The overlay area is not permanent and stores a subset of character patterns known to have high frequency use, but of lesser frequency than in the permanent area. A directory is provided for accessing character patterns in the overlay area. Characters are accessed using character code points. Each character code point represented in the directory has a usage count field and an address pointer field for enabling the character to be chained in a logical sequence with the other characters in accordance with their respective frequencies of use. The directory is searched serially and the search time will be shorter for the characters having highest frequency of use. The characters are accessed in the directory by their code points. Since the permanent area does not change, no directory is needed for accessing the characters in it. When a character is not found in the first memory, it is accessed from the second memory (which may be disk) and is stored in the overlay area and is represented in the directory by overlaying an existing entry of lowest frequency, e.g. zero usage.

1 Claim, 6 Drawing Figures 4,648,069

CHARACTER GENERATOR

INTRODUCTION

The present invention relates to character generators and more particularly to those which store character patterns to be displayed or printed in a memory and accessing this memory using a code point representing a particular character.

BACKGROUND

A character generator provided in a display apparatus or a printer includes, in general, a memory storing a number of character patterns in the form of, for example, matrices, and means for accessing this memory using a code point representing a character to be outputted. In a system having Kanji processing functions, several thousands or, in certain cases, more than ten thousands character patterns must be stored. Therefore, in order to increase performance, the character pattern memory consists of a slow, large auxiliary storage such as a magnetic disk which stores all the character patterns, and a fast, small buffer memory which stores about a thousand character patterns of high frequency in use selected therefrom. This concept is the same as that of storage hierarchy in conventional computers and each character pattern corresponds to a data block. A problem exists in buffer memory management including replacement.

Frequency in use of each character is statistically known to some extent based on which character codes are constructed. For example, a code point of lower value is assigned to a character of higher frequency in use. The standard character code is two bytes (16 bits) wide. When the buffer memory is accessed by a code point, it is first determined by a directory whether a character pattern corresponding to the code point resides in the buffer memory. If it does, the corresponding character pattern is read out by translating the code point to a buffer memory address. If not, it is necessary to transfer the corresponding character pattern to the buffer memory from the auxiliary storage.

As seen from the above, a code point to buffer memory address translation is made faster if a search time of the directory is shorter, and the translation is much faster if the directory may not be used. With regard to the frequency in use of characters, an overall performance is improved if the translation speed is made faster for the characters of higher frequency in use. In the past, however, no character generator has been known which takes the directory configuration and the frequency in use of characters into consideration so as to make the translation speed faster.

OBJECT OF THE INVENTION

An object of the present invention is to provide a character generator including novel access means capable of rapidly accessing a memory which stores a number of characters, using an input code point.

SUMMARY OF THE INVENTION

The present invention accomplishes the above object by providing two memories and two access means.

A first memory includes a resident area permanently storing a plurality of character patterns of high frequency in use, and an overlay area storing a plurality of requested character patterns not found in the resident area whose contents may be replaced, if necessary. The resident area can be accessed without using a directory because it permanently stores each character and hence a fixed relation exists between its addresses and the characters. In the embodiment described later, a random access memory is used as the first memory.

A second memory stores all the character patterns represented by available code points, and a magnetic disk may be used. Old character generaters also include such a memory.

Two access means are provided with respect to the resident and overlay areas of the first memory. A first access means accesses the first memory based on the aforementioned fixed relation when the input code point represents a character stored in the resident area. Therefore, the characters of high frequency in use stored in the resident area can be rapidly accessed and hence the overall performance is improved.

A second access means accesses the first memory by using a specific table when the input code point represents a character stored or to be stored in the overlay area. This table contains a plurality of entries indicating what characters are stored in the respective storage locations of the overlay area and whether the stored characters are currently used. Each entry is arranged so that it reflects a frequency in use of a corresponding character. For example, if the entries are arranged in a chained form and an entry is moved upward in a chain whenever a corresponding character is read out of the overlay area of the first memory, the ones of higher frequency get nearer to the top of the chain while the ones of lower frequency get nearer to the end of the chain. Therefore, entry positions in the chain show approximate frequency in use.

The second access means selects among the characters in the overlay area a character as a candidate for purging which is not currently used and has low frequency in use if the desired character represented by the input code point is not stored in the overlay area. (This is called "miss" in the storage hierarchy technology.) The selected character is replaced with a character read out of the second memory. The table is updated to reflect such replacement.

The foregoing and other objects, features, and advantages of the invention will be apparent from the following detailed description of a preferred embodiment of the invention, as illustrated in the accompanying drawings.

DETAILED DESCRIPTION OF THE PREFERRED EMBODIMENT

Figure 1:
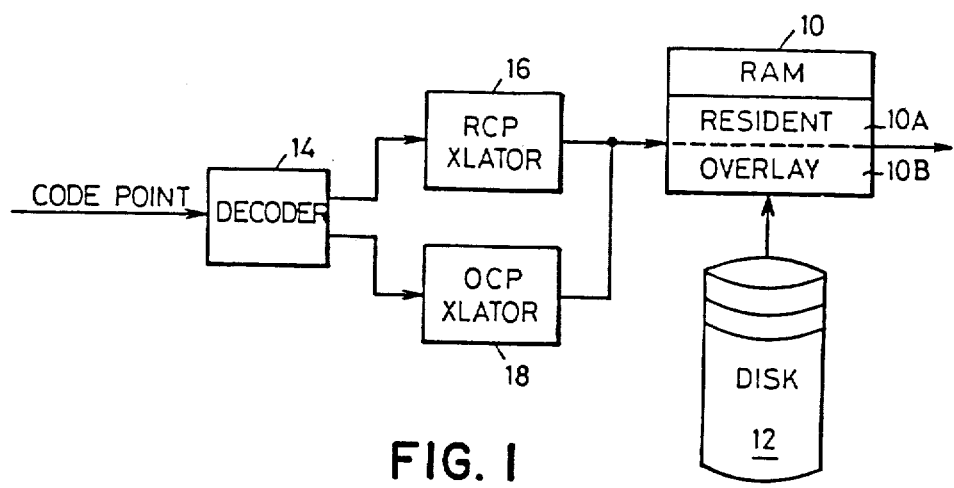
FIG. 1 is a block diagram showing an embodiment of the present invention.

A character generator shown in FIG. 1 includes a random access memory (RAM) 10 divided into a resident area 10A and an overlay area 10B. The resident area 10A stores actual character patterns of high frequency in the form of, for example, matrices and its contents are never replaced during operations. The overlay area 10B, on the other hand, stores actual character patterns not found in the resident area 10A but requested to print or display and its contents may be replaced. The resident area 10A is loaded from a disk 12 during initialization such as IPL while the overlay area 10B is loaded from the disk 12 when a character not found in the RAM 10 is requested. Selected characters may be preloaded into the overlay area 10B.

A two byte code point representing a character to be printed or displayed is received by a decoder 14. The decoder 14 determines from a higher byte of the code point whether the code point is an RCP (Resident Code Point) or an OCP (Overlay Code Point) and transfers it to an RCP translator 16 if it is the RCP and to an OCP translator 18 if it is the OCP. The following table shows a relation between the higher bytes of code points and the characters but the present invention is not limited thereto.

| Higher Bytes (Hex) | Characters |
|---|---|
| X'42' | Alphanumeric |
| X'43' | Katakana |
| X'44' | Hiragana |
| X'45'-X'55' | Basic Kanji Set |
| X'56'-X'68' | Extended Kanji Set |
| X'69'-X'7F' | User Defined Area |

The basic Kanji set in the above table contains Kanji characters of high frequency in use, the extended Kanji set contains Kanji characters required for Japanese word processing but not so required as the basic Kanji set, and the user defined area contains Kanji characters freely defined by users other than the basic Kanji set. The alphanumeric, Katakana and Hiragana characters are all retained in the resident area 10A because the number of these characters is small in contrast to the Kanji characters and the frequency in use is high. Also, Kanji characters of especially high frequency in use ranging from X'45' to X'47' in the basic Kanji set are stored in the resident area 10A. Kanji characters whose code point higher bytes are equal to or greater than X'48' are stored in the overlay area 10B.

Taking compatibility with the conventional EBCDIC code into consideration, a lower byte of each code point is also limited to X'40' or more.

According to the example in the above table, the decoder 14 sends code points with higher bytes of X'42'-X'47' to the RCP translator 16 and code points with X'48' or more to the OCP translator 18. These translators 16 and 18 translate the received code points into indices of corresponding characters for accessing the RAM 10.

The RCP translator 16 translates the code points by using a simple table (not shown) when the decoder 14 determines that their higher bytes are X'42'-X'44' because the number of alphanumeric, Katakana and Hiragana characters is small and hence not all of the code points from X'4240' to X'44FF' are used. In case of Kanji characters, however, the RCP translator 16 generates indices of corresponding Kanji characters by performing the following operations. Although not specifically shown in the drawings, two registers A and B and an ALU are used in the following operations.

1. Load a code point into register B.
2. After initializing register A to all 0's load a higher byte of the code point into a higher byte position of register A.
3. Subtract X'4400' from the contents of register A.
4. Shift register A right twice.
5. Add X'4500' to the contents of register A.
6. Subtract the contents of register A from the contents of register B.
7. And off higher five bits of the subtraction result from (6).
8. Add a start index of resident Kanji.

Expressing by I the start index of resident Kanji, i.e. an index of the first Kanji character stored in the resident area 10A, the above operations realize the following translation.

| Code Points | Indices |
|---|---|
| X'4540' | I |
| X'4541' | I + 1 |
| X'4542' | I + 2 |
| : | : |
| X'45FF' | I + 191 |
| X'4640' | I + 192 |
| : | : |
| X'46FF' | I + 383 |
| X'4740' | I + 384 |
| : | : |
| X'47FF' | I + 575 |

As seen from the above table, the code points inputted to the RCP translator 16 are discontinuous while the indices outputted from the RCP translator 16 are continuous. Additionally, an actual address of the RAM 10 is obtained by adding a predetermined base address to the output index.

Figure 2:
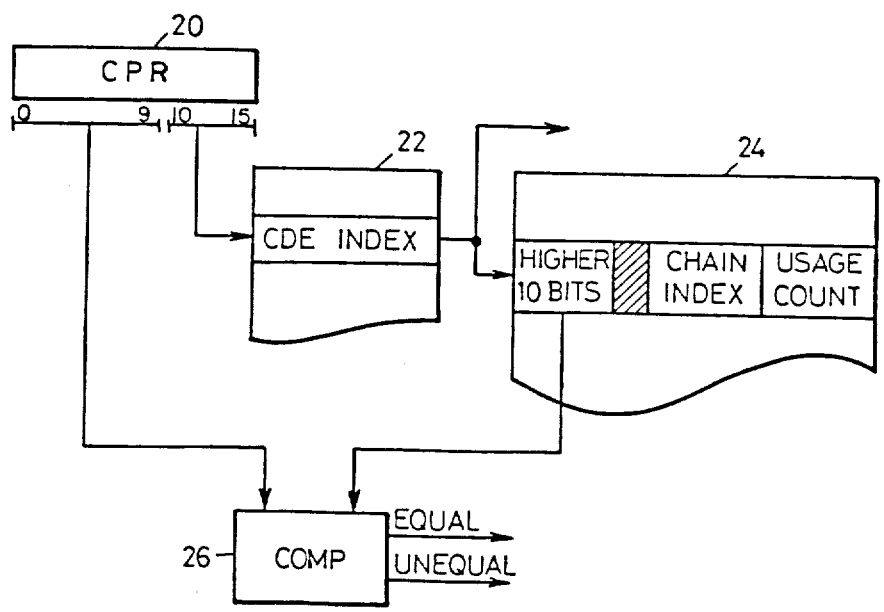
FIG. 2 is a block diagram showing an outline of the OCP translator 18.

The OCP translator 18 which generates indices of Kanji characters in the overlay area 10B from the code points of X'4840' or higher, should first determine whether a Kanji character corresponding to an input code point is actually stored in the overlay area 10B because the Kanji character is not always stored therein. To this end, two tables, i.e. a hash table and a character directory are used. Referring to FIG. 2, a search operation using the hash table and the character directory is next described.

First, the hash table 22 is accessed using lower six bits of a code point held in a code point register (CPR) 20. The hash table 22 contains 64 two byte character directory entry (CDE) indices pointing to particular CDE's, one of which is selected by the lower six bits of the code point. Then, a particular CDE is read out of the character directory 24 by the selected CDE index. Such directory access using the hash table has been well known and is disclosed, for example, in U.S.A. Pat. No. 4,277,826.

Each of the four byte CDE's contained in the character directory 24 corresponds to a particular Kanji storage location in the overlay area 10B and consists of the following four fields.

1. Higher 10 bits of code point.
2. Two bit reserved field. This is shown in FIG. 2 with oblique lines and may be used to indicate whether a corresponding Kanji character is of full size or a left or right half of double size.
3. Chain index. This is a ten bit field and points to a next chained CDE in the character directory 24. Its purpose is as follows. Since each CDE index in the hash table 22 is selected only by the lower six bits of the code point, a plurality of code points having different higher ten bits may select the same CDE index. However, each CDE index can access to a single CDE only and, therefore, remaining CDE's associated therewith, if any, are retained in the character directory 24 in the form of chaining to a preceding CDE. If there is no CDE chained to a current CDE, its chain index is zero.

4. Usage count. This is a ten bit field for preventing a currently used Kanji character from being erroneously purged from the RAM 10. Only the Kanji character having the usage count of zero may be purged from the RAM 10.

When a selected CDE is read out of the character directory 24, its first field is compared in a comparator 26 with the higher ten bits of the code point in the CPR 20. If equal, the search operation of the character directory 24 is terminated and a current CDE index is outputted as an index to a corresponding Kanji character in the RAM 10. Further, the fourth field, i.e. usage count of the CDE found equal is incremented by one to indicate that the corresponding Kanji character in the RAM 10 is being used. The usage count may indicate the number of corresponding Kanji characters displayed on a screen of display device (not shown). When the corresponding Kanji character(s) has been either printed or erased from the display screen, the usage count is reset to zero. The chain index of the CDE found equal is also changed as will be described later.

If the comparator 26 detects unequal, the next CDE is read out by using the chain index as an offset and the same compare operation is repeated. When a CDE having a chain index of zero (end of chain) is reached without detecting equal in the comparator 26, a translation miss is signalled and a replacement operation for the character directory 24 and RAM is started. Since the chain index is also used in this replacement operation, the chain of CDE's is next described before going into detail of the replacement operation.

From a translation efficiency point of view, it is apparently desirable to make translation faster for the characters of higher frequency in use. Therefore, the characters whose frequencies in use are especially high are stored in the resident area 10A so that they are not purged from RAM 10, and their translation process is simpler than that for the Kanji characters stored in the overlay area 10B.

The above is also true for the Kanji characters in the overlay area 10B. That is, the ones of high frequency in use should not be purged from RAM 10 and should be positioned as near the top of chain in the character directory 24 as possible. The frequency in use referred to in this case is different from that of characters stored in the resident area 10A (calculated from long term average) and is determined over a short term, which may, therefore, be varied.

If a requested character has been purged from RAM 10, translation is delayed by a certain amount of time required to transfer the character to the RAM 10 from the disk 12. Additionally, since the character directory 24 is serially searched (chained CDE's are examined one by one) rather than in parallel, a faster translation is possible if a CDE corresponding to the requested character is near the top of chain.

Figure 3A:
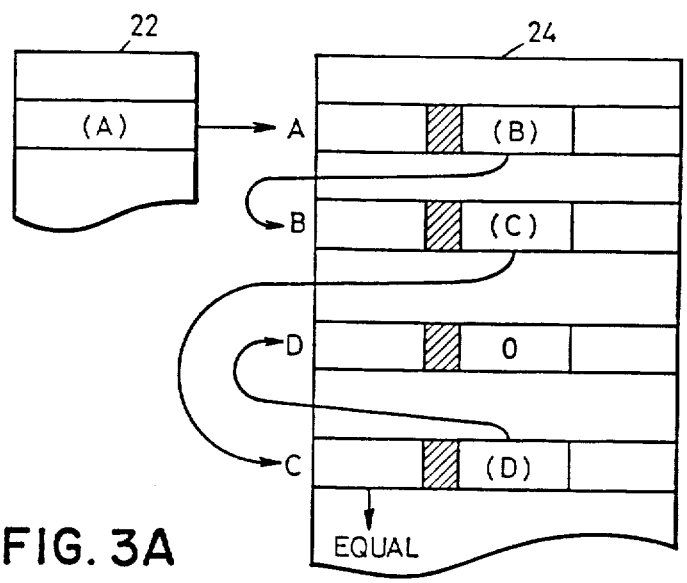
FIGS. 3A and 3B are block diagrams showing change of chaining order in the character directory 24.
Figure 3B:
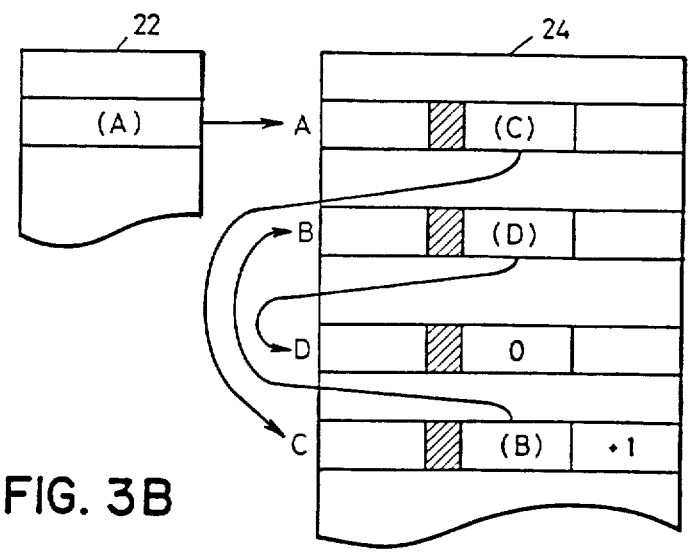

Referring to FIGS. 3A and 3B, a chaining procedure based on the above is next described, assuming that the CDE corresponding to the requested character is found. FIGS. 3A and 3B show situations before and after translation, respectively.

In FIG. 3A, it is assumed that a selected CDE index in the hash table 22 points to CDE(A) in the character directory 24. The chain index of CDE(A) points to CDE(B), the chain index of CDE(B) points to CDE(C), and the chain index of CDE(C) points to CDE(D). The chain index of CDE(D) is zero which indicates the end of chain. Therefore, the CDE chain associated with the selected CDE index in the hash table 22 begins from CDE(A) and ends at CDE(D). If the hash table 22 and the character directory 24 are considered as a single unit, this chain would begin from the CDE index pointing to CDE(A). Each of the other CDE indices contained in the hash table 22 is also associated with a similar CDE chain. In these CDE chains, chaining orders of CDE's do not always coincide with their address orders in the character directory 24.

In FIG. 3A, it is assumed that CDE(C) chained at a third position is found equal. The OCP translator 18 (FIG. 1) increments the usage count of CDE(C) by one and promotes the chaining order of CDE(C) by one position. This is done by changing the chain indices of CDE(A), CDE(B) and CDE(C) in the following manner. The CDE's per se are not moved in the character directory 24.

1. Save the chain indices of two preceding CDE's, i.e. CDE(A) and CDE(B) during a search of a current CDE (CDE(C)).
2. Put the chain index pointing to CDE(C) which has been contained in CDE(B) into the chain index field of CDE(A).
3. Put the contents of chain index field of CDE(C) into the chain index field of CDE(B).
4. Put the chain index pointing to CDE(B) into the chain index field of CDE(C).

By the above steps 1-4, the chaining order of each CDE is changed as shown in FIG. 3B. Thus, it is readily understood that the CDE's of higher frequency in use are positioned nearer to the top of chain.

If a CDE with equal higher ten bits has not been found at the end of the chain, different steps are taken. That is, it is first determined which old character should be purged from the overlay area 10B of RAM 10 so that the requested character (overlay Kanji) is transferred from the disk 12. A character which is not currently used and of low frequency in use is a candidate for purging.

The usage count in a CDE indicates whether a corresponding character stored in the overlay area 10B is being used. The usage count shows, for example, the number of display times of the character on a screen but may be set to a certain value other than zero when the character is to be remained in the overlay area 10B even if not being used. The usage count is reset to zero when the corresponding character becomes unused or available for purging. With regard to the frequency in use, it appears from the aforementioned steps 1-4, that the CDE's corresponding to the characters of low frequency in use are positioned near the end of the chain. Therefore, a character which is not currently used and of low frequency in use corresponds to the last CDE with the usage count of zero in the associated CDE chain.

From a translation efficiency point of view, it is desired that a length of each chain, i.e. the number of CDE's is as close to an average as possible. For example, the average of chain length is 16 if the hash table 22 has 64 CDE indices and the character directory 24 has 1024 CDE's.

Figure 4A:
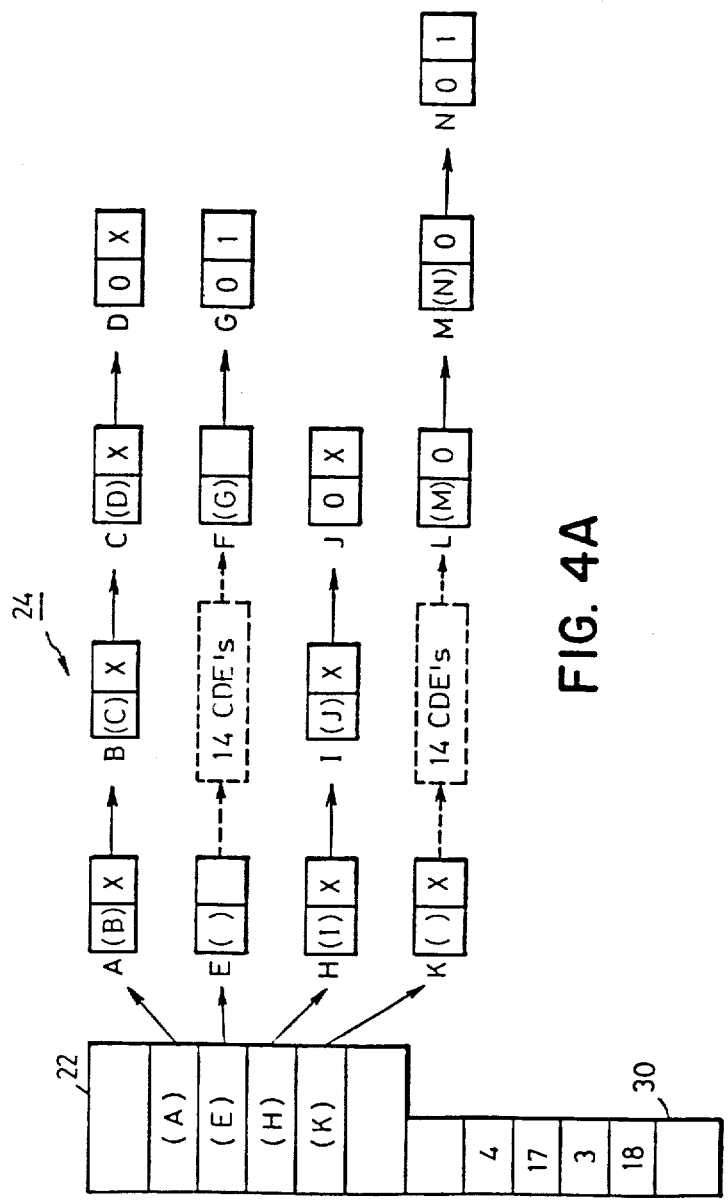
FIGS. 4A and 4B are block diagrams showing candidate selection for purging in the character directory 24.
Figure 4B:
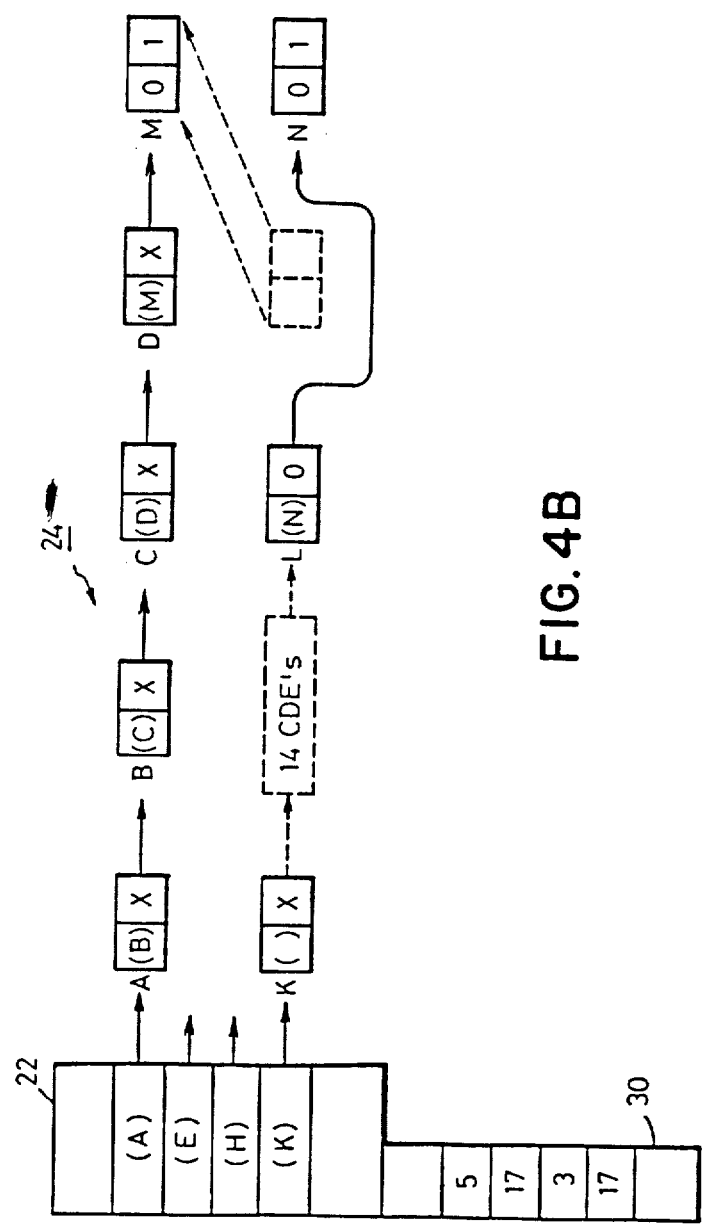

Lastly, referring to FIGS. 4A and 4B, the above chaining procedure including alteration of CDE's is explained in detail. In FIGS. 4A and 4B, among all the CDE's in the character directory 24, only chained CDE's associated with CDE indices (A), (E), (H) and (K) are shown with only the chain index and usage count fields. "X" in the usage count field represents any integer equal to or greater than one. A chain length table 30 of one byte width is accompanied with the hash table 22 for the purpose of making the length of each CDE chain as close to the average (e.g. 16) as possible. The chain length table 30 holds as entries lengths of chains associated with the respective CDE indices in the hash table 22. Therefore, the number of entries in the chain length table 30 is identical to that of the hash table 22 and the entries can be accessed by the lower six bits of code point. It is, of course, possible to unify the hash table 22 and the chain length table 30.

FIG. 4A shows a situation of four CDE chains prior to a search of character directory 24. These chains begin from CDE(A), CDE(E), CDE(H) and CDE(K), respectively, and their lengths are 4, 17, 3 and 18, respectively. A CDE with the chain index of zero is chained at the end of each chain. The usage count of the last CDE is not always zero. That is, the usage count becomes equal to or greater than one even if the frequency in use is low but currently used.

It is assumed that the CDE index pointing to CDE(A) has been selected from the hash table 22 by the lower six bits of code point but the contents equal to the higher ten bits of the same code point have not been found in any one of CDE(A)–CDE(D), i.e. a translation miss has occurred. The procedure is as follows.

1. Use the lower six bits of the same code point as a chain length table pointer, sequentially read out the entries of chain length table 30 by incrementing the pointer one by one, and determines whether its content is equal to or greater than the average (assumed to be 16).
2. Repeat (1) until an entry having the chain length of 16 or more is found. During the operation, a wrap-around from the last entry of chain length table 30 to the first entry may occur.
3. When the entry having the chain length of 16 or more is found, examine the usage counts of CDE's on and after the 15th position in a chain associated with a CDE index selected by a current pointer, i.e. lower six bits of code point. If no CDE with the usage count of zero is found, return to (2).
4. If one or more CDE's with the usage count of zero are found, select as a candidate for purging a CDE nearest to the end of the chain.
5. If all the entries of chain length table 30 have been accessed to find no CDE as the candidate for purging, repeat the same procedure from (1). In this repetition, however, the conditions of selecting the one of low frequency in use (positioned near to the end of the chain) and of making each chain length as close to the average as possible are dropped.

In the example of FIG. 4A, a first entry having the chain length of 16 or more in the chain length table 30 corresponds to the chain beginning from CDE(E). However, CDE(F) which is the 15th CDE and CDE(G) which indicates the end of chain cannot be the candidate for purging because each of their usage counts is one. Therefore, a chain corresponding to a next entry having the chain length of 16 or more, i.e. the chain beginning from CDE(K) is next examined. In this chain, each of the usage counts of 15th CDE(L) and 16th CDE(M) is zero, but selected as the candidate for purging is CDE(M) which is nearer to the end of the chain. Since CDE is in a chain which is different from the first chain beginning from CDE(A), it is necessary to move CDE(M) into the first chain. This is done as follows.

1. Save an address of preceding CDE(L) in the same chain while a current CDE (CDE(M)) is tested whether it can be the candidate for purging.
2. Put into the chain index field of CDE(L) the chain index in CDE(M) which points to CDE(N). CDE(M) is, thereby, removed for this chain.
3. Set the chain index and the usage count in CDE(M) to zero and one, respectively, indicating the end of chain and in use.
4. Put the chain index pointing to CDE(M) into the chain index field of CDE(D) which is the last CDE of the chain beginning from CDE(A).
5. Load into the first code point field of CDE(M) higher ten bits of the code point for which the translation miss has occurred.
6. In the chain length table 30, increment by one the length of the chain beginning from CDE(A) to five, and decrement by one the length of the chain beginning from CDE(K) to 17.

FIG. 4B shows a situation after the above procedure has been completed. Movement of CDE(M) is shown by dotted lines. As described earlier, the CDE per se is not physically moved in the character directory 24 but merely some associated chain indices are changed.

The translation of code point is completed by fetching from the disk 12 an actual character pattern represented by the code point and storing it into a storage location corresponding to CDE(M) in the overlay area 10B of RAM 10. The disk 12 which permanently stores all the characters represented by available code points may be accessed by a unit (not shown) similar to the RCP translator 16 because there is a fixed relation between its character storage locations and the code points just like the case of resident area 10A. The OCP translator 18 outputs an index pointing to CDE(M) so that the character read out of the disk 12 is stored into the storage location corresponding to CDE(M) in the overlay area 10B of RAM 10. Thereafter, the requested character can be printed or displayed.

While there has thus been described and illustrated a specific embodiment of the invention, it will be clear that variations in the details of the embodiment specifically illustrated and described may be made therein without departing from the true spirit and scope of the invention as defined in the claim.

Having thus described our invention, what we claim as new and desire to secure by Letters Patent is:

1. A character generator for outputting an actual pattern of a given character in response to a code point representing said given character, comprising the following (a) through (d):
    (a) a first memory including a resident area permanently storing a plurality of character patterns having a frequency range in use, and an overlay area storing a plurality of requested character patterns not found in said resident area, the contents of said overlay area being replaceable;
    (b) a second memory permanently storing all character patterns represented by available code points, and transferring requested character patterns to said first memory;

(c) first access means for accessing said first memory based on a fixed relation between an input code point and a storage location of a character when said input code point represents a character stored in said resident area; and (d) second access means for accessing said first memory using a table having a plurality of entries when the input code point represents a character stored or to be stored in said overlay area, said entries indicating what characters are stored in the respective storage locations of said overlay area and whether the stored characters are currently used, and being ordered so that each of said entries reflects frequency in use of a corresponding character, said second access means selecting among the characters stored in said overlay area a character not currently used and having a lower frequency in use than the frequency range and being a candidate for purging and for replacing said character with a desired character read out of said second memory, and updating said table, if the desired character is not stored in said overlay area and is being brought into the overlay area.

* * * * *